Feb. 12, 1957 C. J. GUY 2,780,989
WOOD WASTE SHAVING AND SAWDUST BALER
Filed March 4, 1953 4 Sheets-Sheet 1

INVENTOR.
Clarence J. Guy,
BY Victor J. Evans & Co.
ATTORNEYS

Feb. 12, 1957 C. J. GUY 2,780,989
WOOD WASTE SHAVING AND SAWDUST BALER
Filed March 4, 1953 4 Sheets-Sheet 2
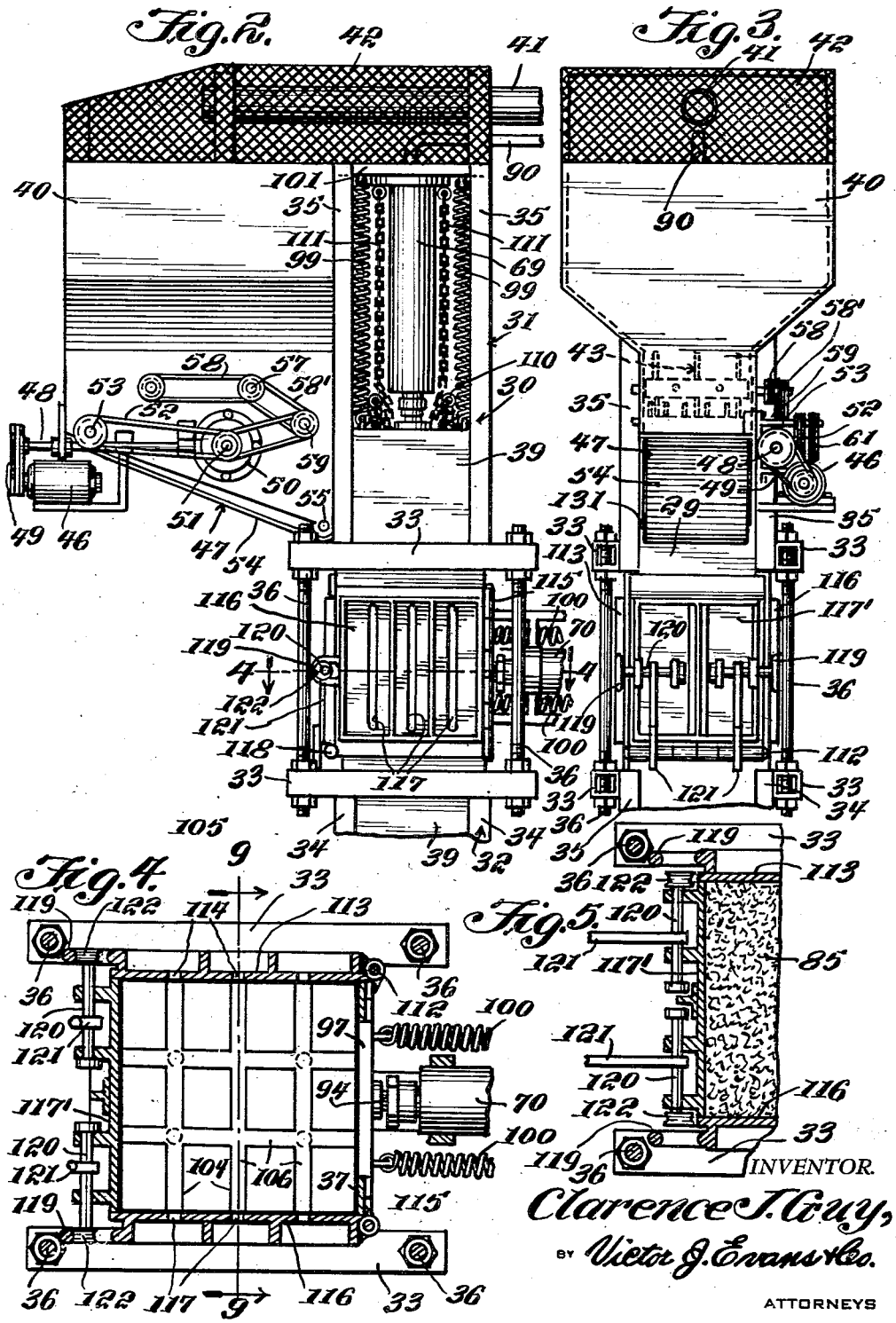
INVENTOR.
Clarence J. Guy,
BY Victor J. Evans & Co.
ATTORNEYS

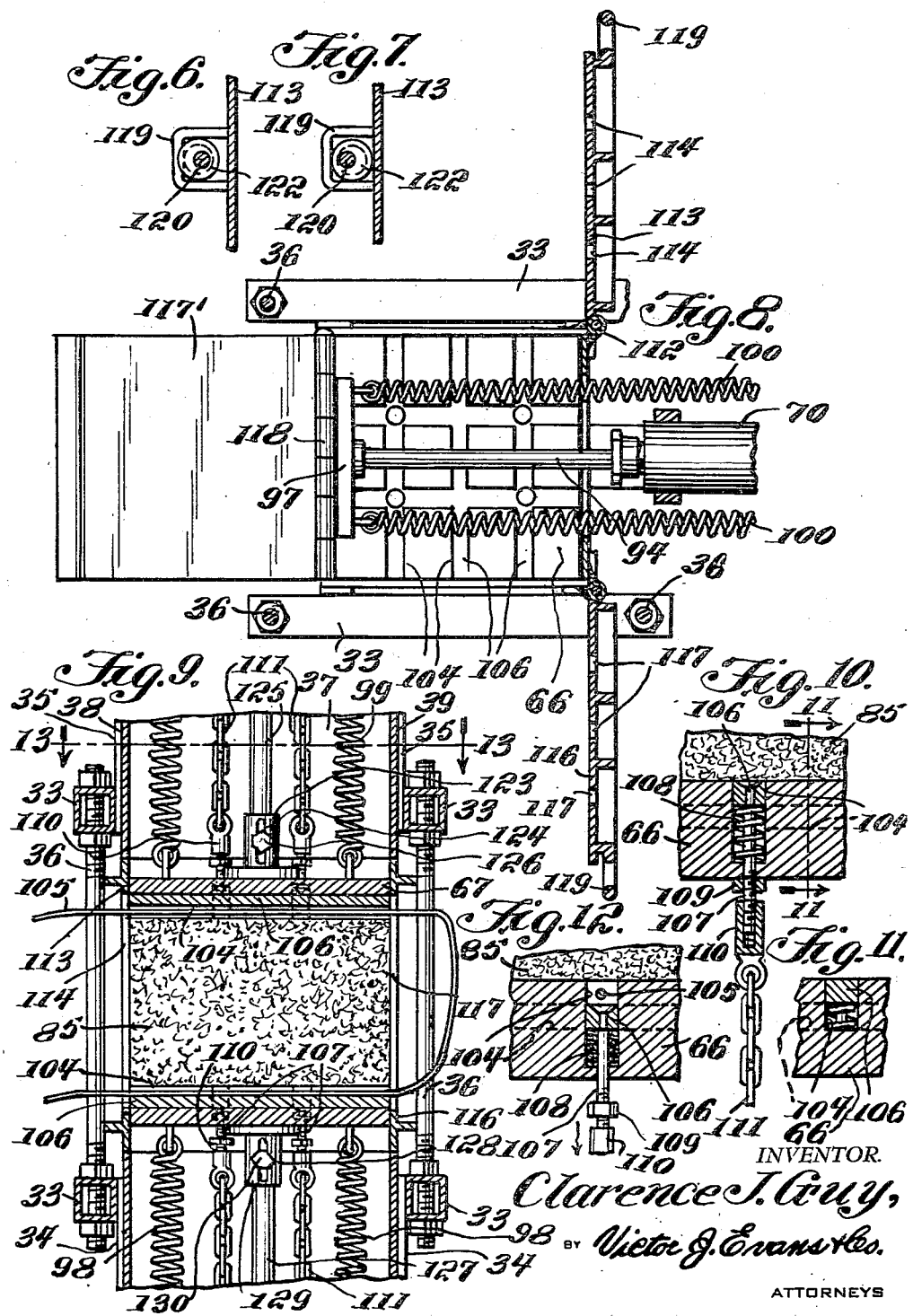

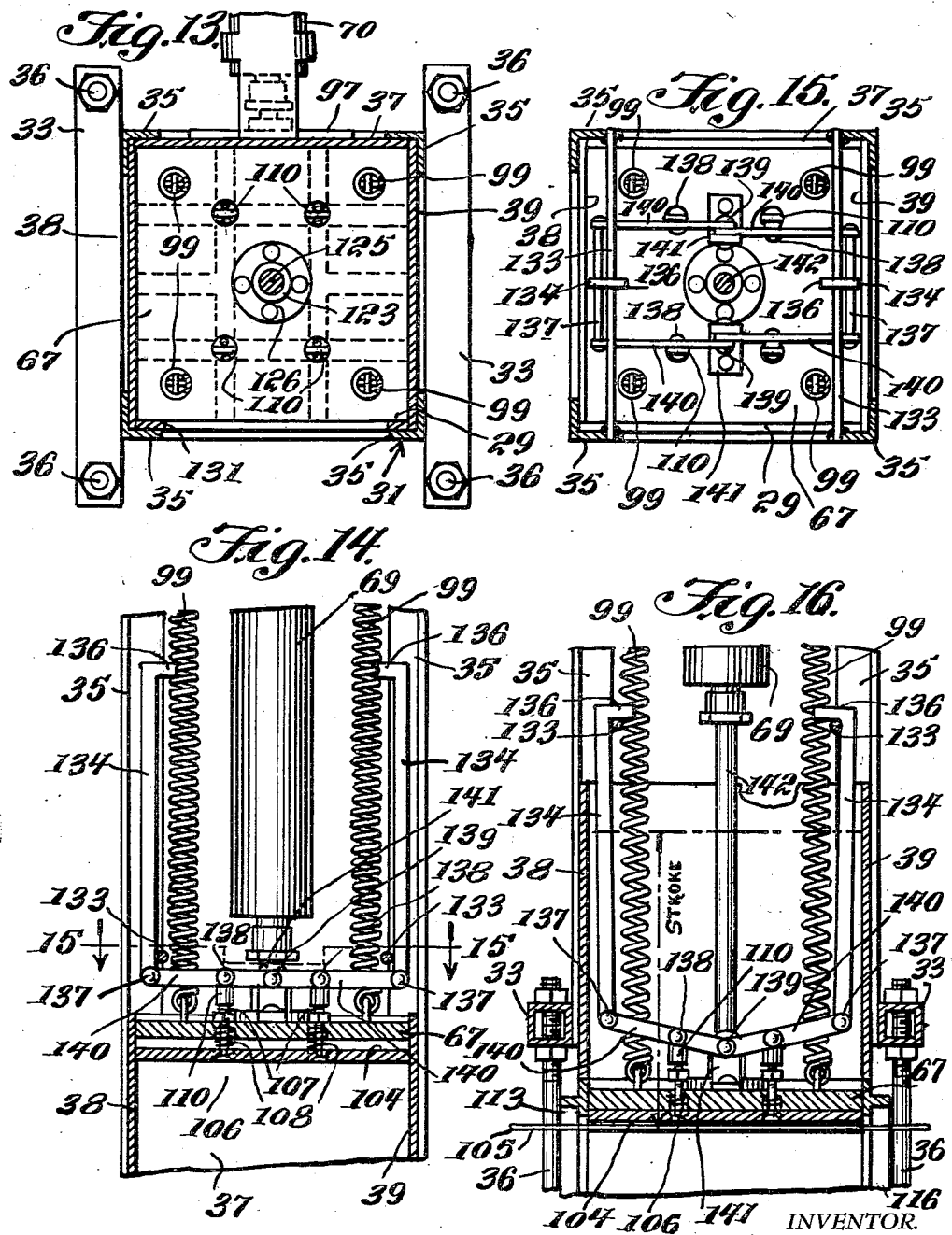

United States Patent Office 2,780,989
Patented Feb. 12, 1957

2,780,989

WOOD WASTE SHAVING AND SAWDUST BALER

Clarence J. Guy, Laneville, Tex., assignor of one-half to R. H. Guy, Laneville, Tex.

Application March 4, 1953, Serial No. 340,270

4 Claims. (Cl. 100—218)

This invention relates to a method of and apparatus for use in saving wood waste and baling the wood waste or sawdust.

The object of the invention is to provide a method of and apparatus for manufacturing a product from wood waste or sawdust, the manufactured product having extensive and essential use in the commercial poultry raising industry.

Another object of the invention is to provide a method of and apparatus for utilizing waste products such as wood fiber shavings from planer mills, pole mills and other wood manufacturing wastes whereby these materials can be treated and baled to be later used as "litter" or "bedding" which is especially suitable for use in poultry houses as an insulation against heat and cold and to insure dryness and to provide more sanitary premises for the raising of commercial flocks.

A further object of the invention is to provide a baling machine and process which is extremely simple and economical to utilize.

Other objects and advantages will be apparent during the course of the following description.

In the accompanying drawings, forming a part of this application, and in which like numerals are used to designate like parts throughout the same:

Figure 2 is a side elevational view showing a portion of the baling machine of the present invention and with the upper cylinder head in raised position.

Figure 3 is a front elevational view of a portion of the baling machine.

Figure 4 is a sectional view taken on the line 4—4 of Figure 2.

Figure 5 is a fragmentary sectional view similar to Figure 4, but showing the doors unlocked.

Figure 6 is a fragmentary sectional view showing the cam in locked position.

Figure 7 is a view similar to Figure 6 but showing the cam in unlocked position.

Figure 8 is a view showing the side doors in open position and with the bale ejector in forward position.

Figure 9 is a sectional view taken at right angles to the view shown in Figure 1 and showing a modified form of the invention.

Figure 10 is a fragmentary sectional view showing the chain connection to the grid.

Figure 11 is a sectional view taken on the line 11—11 of Figure 10.

Figure 12 is a fragmentary sectional view similar to Figure 10 but showing the head moved to the extent that the grids are pulled downwardly in the cylinder heads so that the tying wires can be inserted around the bales.

Figure 13 is a sectional view taken on the line 13—13 of Figure 9.

Figure 14 is a fragmentary sectional view showing a modified connection of the cylinder head.

Figure 15 is a sectional view taken on the line 15—15 of Figure 14.

Figure 16 is a view similar to Figure 14 but showing the parts moved so that the tying wires can be inserted around the bales to be tied.

Figure 1:
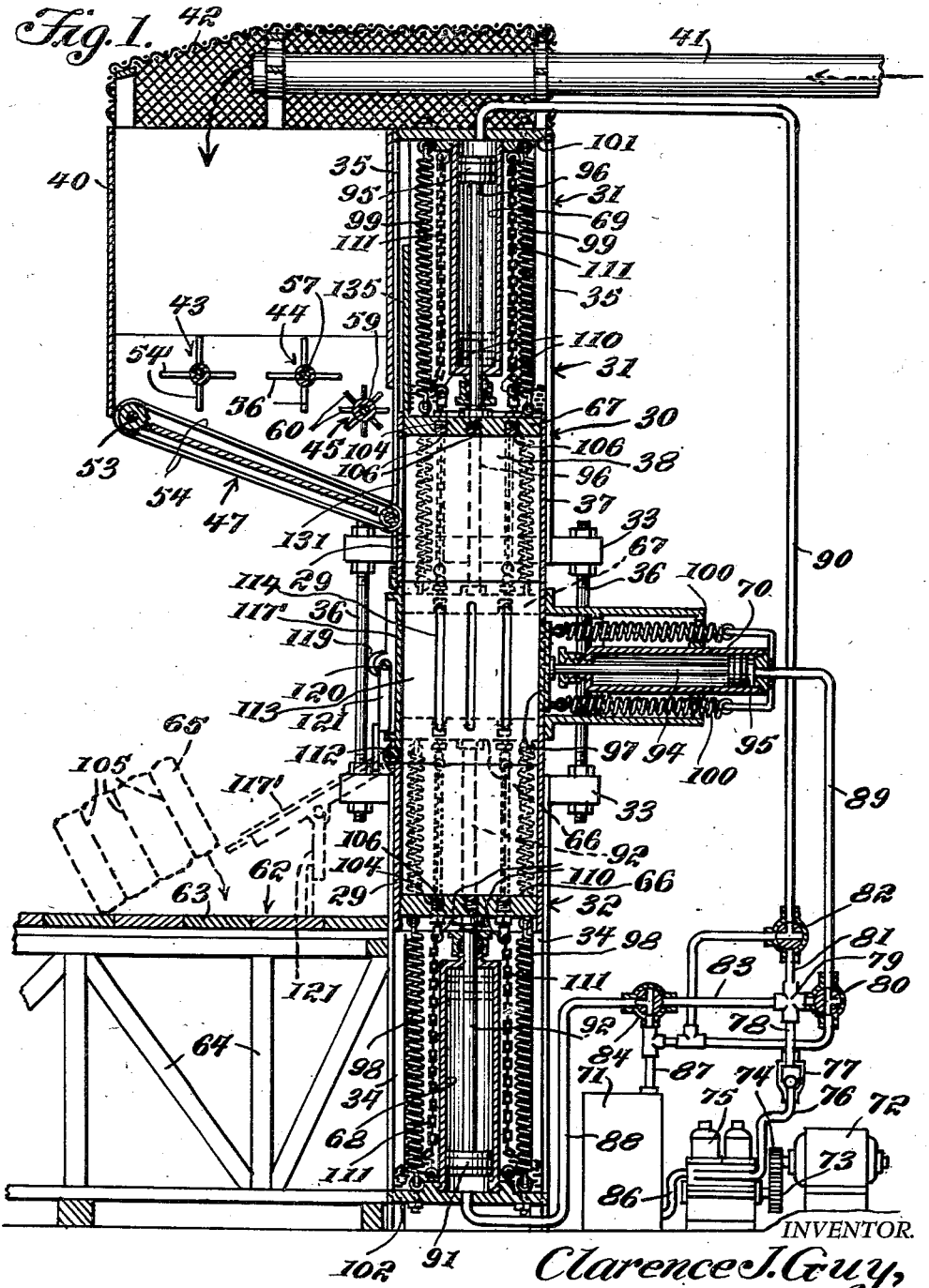
Figure 1 is a longitudinal sectional view taken through the baling machine, constructed according to the present invention, and with the cylinder heads in their extended position.

According to the present invention a product is manufactured which has extensive and essential use in the commercial poultry raising industry. This product is commonly called "litter" or "bedding" and is used in a great many poultry houses for insulation against heat and cold, for insuring dryness, and to provide more sanitary premises for the raising of commercial flocks. In the process and machine of the present invention wood fiber shavings from planer mills, pole mills, and other wood manufacturing wastes are used and although these waste materials have already been used for "bedding" and "litter," heretofore such use has been limited because the waste products are voluminous to handle and excessive moisture therein made the waste products subject to fungus growth which might include certain molds that could be harmful to growing chicks. Also, the present invention overcomes the aforementioned difficulties and makes the product available in concentrated quantities regardless of adverse weather conditions. As later described in this application, a chemical process is provided for treating these waste materials to insure a sterile and sanitary "litter" product and there is also provided an economical drying process whereby these processes together with the baling machine will enable a volume of approximately 24 cubic feet of waste material to be compressed or concentrated into a uniform marketable bale having dimensions of 2 feet by 2 feet by 2 feet. By means of the present invention the cost of producing the completed bale is quite low.

In actual practice to convert the wood shavings and sawdust into the commercial poultry product or poultry "litter," the wood shavings and sawdust are obtained as a by-product of sawmills, lumber mills and other wood manufacturing plants, such material ordinarily being regarded as a waste material. The material is generally green and due to the warm climate of the timber belts this waste material is subject to early decomposition so that it is often turned into an undesirable dark blue or brown. The warm climate of these areas serves as an ideal incubation area for the growth of spore-like organisms having an enzyme like action which add to the early decomposition. Of these spore-like organisms, there are a few of these growths or molds that are harmful to animal life (genus Aspergilli). These waste materials when not subject to the above conditions but are left out in the open and are exposed to excess moisture will likewise be exposed to the same conditions.

In the beginning of decomposition the soft woods such as pine, gum and the like the color factor is generally brown to a dark blue which from a manufacturing and finished product point of view would be financially hazardous as the discolored material would not have a sales appeal. Also, this waste in its virgin state contains excessive moisture (to the extent of 50% in some instances) and this factor alone defeats the requisites of a "litter" or "bedding" as the finished product must have high water absorptive qualities. All of these factors are given herein, and according to the present invention these factors or disadvantages are overcome so that there is provided a sterile and satisfying finished product with sales appeal and which is safe so that it can be used for growing poultry flocks as well as for other animals.

The process utilized is as follows. The raw waste materials are fed by a pneumatic conveyor directly from the mill to an inclined stationary screen whereby the fines are separated from the larger particles. The larger particles are fed into a gravity chute and enter into a special screw fed rotary drum dryer whereby heat is applied at a temperature of 350 degrees to 450 degrees F. to thereby reduce the moisture content to approximately 5%. This material, through inclined gravitational force, is carried to a distance of approximately 45 feet whereby it is dumped into an especially constructed air locking chute. During the interval of 3 to 9 minutes, this material, due to sudden heat and loss of moisture, has caused the cellular cells of the fiber to break and twist into a deformed pattern, as per the regular cellular structure of wood. This results in a breaking up of the fibers in a more soft and pulpy mass to thereby enable this material to have the capacity of 30% more absorptive qualities. From the air lock chute, the material is pneumatically conveyed to special spray nozzles contained in the pneumatic tube whereby chemical compounds such as liquids are sprayed on and impregnated in the incoming material. The compounds are for the sterilization of harmful spores that might affect animal life and also to reduce the flame point of this material. This material is then conveyed to a second inclined screen to remove other fines that might be contained due to breaking up of the processing. At this point this material usually contains 14% to 15% moisture which is normal humidity in most areas and is thus conveyed by a gravitational chute and belt conveyor to the baling apparatus. The material is baled, as later described in this application, and tied into uniform bales of 2 feet by 2 feet by 2 feet with an approximate weight of 110 pounds. This process results in a well uniformed, golden color soft fluffy fibered mass which is ideal for bedding of poultry and other animals and wherein the product has a high degree of sterility and a high water absorptive characteristic which is in the ratio of 3 to 1 by weight. Also the product has a safe fire point and is dust free and the material is easily broken out of the bales and covers the required poultry house readily and easily.

Referring in detail to the drawings, the numeral 30 designates a frame which may be fabricated of any suitable material such as metal, and the frame 30 includes an upper section 31 and a lower section 32. Braces 33 may be secured to the upper section 31 and lower section 32 in any suitable manner, as for example by welding, and suitable bolt and nut assemblies 36 extend between the braces 33 and are secured thereto for maintaining these parts in alignment. The lower section 32 includes a plurality of vertically disposed spaced parallel angle irons 34, and the upper section 31 includes spaced parallel vertically disposed angle irons 35. The frame 30 further includes a back wall 37, and spaced parallel side walls 38 and 39, Figures 1 and 13, and front 29. The numeral 40 designates a hopper which is adapted to receive the waste material such as shavings or sawdust from a conduit 41, and the waste material tube may pass through a screen 42 on its way to the hopper 40. Positioned within the hopper 40 is a pair of agitators 43 and 44 which serve to constantly maintain the waste products stirred up in the hopper, and there is also provided within the hopper 40 a feed member 45 which helps direct the material towards the baling chamber. For operating the agitators 43 and 44, a suitable motor 46 is provided and the motor 46 may be connected to a suitable source of electrical energy. The motor 46 serves also to operate a conveyor 47 which guides the material into the baling chamber. The motor 46 operates a drive shaft 48 through a belt and pulley mechanism 49, Figures 2 and 3, and the drive shaft 48 is connected to a reducing gear assembly 50 which operates a driven shaft 51. An endless belt 52 is operated by the shaft 51 and the belt 52 serves to drive a shaft 53 which forms part of the conveyor 47. The agitator 43 includes a plurality of radially extending fingers 54' which maintain the material in a loose condition and the other agitator 44 includes fingers 56 for also breaking up or maintaining the material in a loose condition. An endless belt 58 extends from the agitator 43 to the agitator 44 so that the shaft 57 of the agitator 44 will be driven as the shaft 53 is driven. An endless belt 58' extends from the agitator 44 to the feed member 45, and the belt 58' drives a shaft 59 that has a plurality of fingers 60 extending therefrom. An endless belt 61 extends between the feed member 45 and the gear reducing assembly 50. The conveyor 47 includes a pair of shafts 53 and 55 which are operated by an endless belt 52 leading from the assembly 50, and an endless belt 54 is trained over pulleys mounted on the shafts 53 and 55.

Slidably mounted within the frame 30 is a pair of cylinder heads or plungers 66 and 67, Figure 1. The numeral 62 designates a platform which is adapted to receive the completed bale 65, and the platform 62 includes a horizontal shelf 63 that may be supported by legs or braces 64. The numeral 68 designates a hydraulic cylinder for moving the head 66 upwardly, while the numeral 69 designates a hydraulic cylinder for moving the head 67 downwardly so that when these heads are moved together the wood shavings 85 will be compressed therebetween. The numeral 70 designates an ejector mechanism which is also hydraulically operated whereby the completed bale 65 will be ejected from the baling chamber to the position shown in Figure 1 whereby it can be loaded onto a waiting truck or other locality.

The hydraulic means for operating the cylinders 68, 69 and 70 is shown in detail in Figure 1, and this means includes a tank 71 which is adapted to hold a suitable quantity of hydraulic fluid. The numeral 72 designates a motor which may be connected to a suitable source of electrical energy or which may be gasoline operated, and the motor 72 operates a gear 73 which is arranged in engagement with a gear 74, and the gear 74 serves to operate a compressor 75. A conduit 76 leads from the compressor 75 to a check valve 77, and a conduit 78 leads from the check valve 77 to a fitting 79. A valve 80 is arranged in communication with the fitting 79, and a conduit 81 leads from the fitting 79 to a valve 82. A further conduit 83 leads from the fitting 79 to a valve 84. A conduit 86 leads from the compressor 75 to the tank 71, and a conduit 87 leads from the valve 84 to the tank 71, there being a conduit 88 extending from the lower end of the hydraulic cylinder 68 to the valve 84. There is further provided a conduit 89 which extends from the outer end of the cylinder 70 to the valve 80, and a conduit 90 leads from the valve 82 to the upper end of the upper hydraulic cylinder 69. By properly adjusting the valves 84, 82, and 80, hydraulic fluid can be selectively injected into the cylinders 68, 69 and 70 so as to actuate the plungers therein. Also, the valves can be set so that the hydraulic fluid will bleed back to the tank 71.

Reciprocably arranged in the cylinder 68 is a piston 91 which has a rod 92 connected thereto, and the upper end of the rod 92 is secured to the cylinder head 66. Slidably arranged in the ejector cylinder 70 is a piston 93 which is connected to a rod 94, and an end of the rod 94 is connected to a movable plate 97. Thus, when hydraulic fluid is introduced into the cylinder 70 through the conduit 89, the plate 97 will eject or force out the bale 65 after the front door has been opened so that the bale 65 will move to the position shown in broken lines in Figure 1. The numeral 85 designates the wood shavings in their condition before they are fully compressed and tied into the bale 65. Slidably mounted in the upper cylinder 69 is a piston 95 and connected to the piston 95 is a rod 96, the lower end of the rod 96 being secured to the movable head 67. Springs 98 are provided for normally biasing the head 66 to its lowered position, and springs 99 are provided for normally biasing the head 67 to its uppermost position. Similar springs 100 are provided for normally maintaining the plate 97 in the position shown in Figure 1. The upper ends of the springs 99 may be secured to a top member 101, and the lower ends of the springs 98 may be anchored or secured to a base 102. The outer ends of the springs 100 may be secured to a yoke 103.

A means is provided for permitting wires 105 to be tied around the bale 65 after the wood shavings have been compressed in the baling chamber. This means comprises a plurality of slots 104 which are arranged in the head 67. It is to be understood that although only the mechanism for inserting the wires 105 through the head 66 is shown and described in detail, it is to be understood that a similar mechanism is provided for the upper head 67. Arranged in the head 66 is a plurality of slots or grooves 104 which extend at right angles with respect to each other, Figures 10, 11 and 12, and Figure 4. A grid 106 includes a plurality of right angularly arranged bars which are slidably mounted in the slots 104, and normally the bars of the grid 106 lie flush with the upper surface of the head 66. A means is provided for retracting or withdrawing the grid bars 106 into the slots 104 so that the grid bars moved from the position shown in Figure 10 to the position shown in Figure 12. With the grid bars 106 retracted or withdrawn as shown in Figure 12, a space is provided whereby the bale wire 105 can be inserted or extended around the bale 65 so that the bales can be manually tied with wire. For automatically retracting the grid bars 106 to the position shown in Figure 12, a plurality of bolts 107 slidably extend through the head 66. A coil spring 108 is positioned on each of the bolts 107 within a slot or opening, and a lock nut 109 is arranged in threaded engagement with each of the bolts 107. A casing 110 is arranged in threaded engagement with the outer end of each of the bolts 107, so that by adjusting the casing 110 the length of each of the chains 111 can be adjusted as desired. The chains 111 are connected to the casing 110, and the other ends of the chains 111 are secured to the base 102, or to the top member 101 as the case may be. Thus, it will be seen that normally the chains 111 are long enough so that the springs 108 will urge the grid bars 106 to a position flush with the outer surface of the cylinder head, but after the cylinder heads 66 and 67 have been moved towards each other by the hydraulic pistons, the chains 111 will be extended sufficiently to withdraw the grid bars 106 inwardly to the position shown in Figure 12 against the coil spring 108. This will provide sufficient clearance so that the wires 105 can be extended through the slots 104 and tied around the bale 65.

A hinge 112 hingedly or pivotally connects a side door 113 to the frame, and the door 113 is provided with a plurality of openings or slots 114, Figure 8. A hinge 115 pivotally connects a second side door 116 to the frame, and the door 116 is also provided with slots 117. The slots 114 and 117 permit the tying wires 105 to be extended therethrough when the bale is being tied. A door 117' is pivotally connected to the front of the frame by a hinge 118.

A means is provided for locking these doors to prevent acidental opening of the doors, and this means comprises a pair of slidable and rotatable shafts 120 that are connected to the front door 117'. Carried by each of the doors 113 and 116 is a support bracket 119, and mounted on each of the pair of shafts 120 is a cam 122. A handle 121 is connected to each of the shafts 120 for rotating or sliding the shafts. The shafts 120 can be moved by means of the handles 121 so that the cams 122 engage the support brackets 119 whereby the doors will be locked as shown in Figure 4 and Figure 6. Or, the shafts 120 can be rotated so that the cams 122 move to the position shown in Figure 7 whereby the doors can be swung open about their hinges. The shafts 120 are rotatably and slidably supported in suitable bearings. The locks are shown in their unlocked position in Figure 5.

With the front door 117' open, it will be seen that the door 117' will provide a ramp whereby the bale 65 being ejected by the plate 97 will automatically move down onto the platform 62 where it can be hauled away.

In Figure 9 there is shown a slightly modified connection between the piston rods 125 and 127 and the respective cylinder heads 66 and 67. Thus, in Figure 9 the piston rods are indicated by the numerals 125 and 127, and these rods are used in lieu of the rods 92 and 96. A sleeve 123 is provided with a slot 124, and a suitable securing element 126 extends through the slot 124 and into engagement with the rod 125, the sleeve 123 being secured to the head 66. Similarly, the other or upper rod 127 extends into a sleeve 128 that is provided with a slot 129, and a bolt or securing element 130 extends through the slot 129 and into engagement with the rod 127, the sleeve 128 being secured to the upper head 67. The securing elements 126 and 130 can be adjusted so as to vary the stroke of the cylinder heads.

The numeral 131 indicates the opening in the front of the frame whereby the waste material can pass from the hopper 40 to the baling chamber 132. A plate 135 is carried by the upper movable head 67, and the plate 135 is adapted to move into closing or bridging relation with respect to the opening 131 so that no more waste material will be able to enter the baling chamber 132 from the hopper 40 while the heads 66 and 67 are compressing the material.

Referring to Figures 14, 15 and 16 there is shown a slightly modified form of the invention. In this form of the invention a different means is provided for withdrawing the grid bars 106 so that the wires 105 can be inserted through the slots 104. In this form of the invention the numeral 133 designates each of a pair of bars which are adapted to be engaged by transverse fingers or lugs 136 that are integral with movable bars 134. Rods 137 interconnect the lower ends of the bars 134 together, and links 140 lead from the bars or pins 137 to brackets 141, the links 140 being pivotally connected to the brackets 141 by pins 139. The brackets 141 may be secured to the head 67 in any suitable manner, as for example by securing elements. It will be seen that for each of the cylinder heads there are two of the bars 134, and the lower end of each of the bars 134 is mounted on a pin 137 which extends between the outer ends of the pairs of links 140. Pins 138 serve to pivotally connect the links 140 to the casings 110, and the casings 110 are connected to the bolts 107 which are secured to the grid bars 106. Thus, this arrangement is used in lieu of the chains 111 for withdrawing the grid bars 106 to permit the wires 105 to be inserted around the bales 65. The piston rod in the modified form of the invention of Figures 14, 15 and 16 is indicated by the numeral 142, and it will be understood that there will be provided an upper and lower piston rod, and the piston rods 142 are adapted to be secured to the heads 66 and 67.

From the foregoing, it is apparent that a method of and apparatus has been provided for manufacturing the bales 65 that can be later used for extensive and essential use in the commercial poultry raising industry. The bales 65 can be stored or shipped conveniently and when broken down these bales will provide material for the so called "litter" or "bedding" that is used in poultry houses for insulation of heat and cold as well as for insuring dryness and to insure that the premises will be sanitary. The material 85 enters the baling machine through the conduit 41 after it has been treated chemically to insure that the material is sterile and sanitary and dry. In the baling machine illustrated in the drawings, the material is pressed or concentrated so that the material will occupy a minimum amount of space. The method of treating the material before it passes through the conduit 41 has been previously described in this application. The modified construction shown in Figure 9, including the slots 129 and 124 provide a floating action for the heads.

Also, this product can be used as a mulch as well as for maintaining the ground in good condition. The conveyor 47 feeds the material into the baling chamber 132 and the agitators 43 and 44 maintain the material stirred up or loosened up. The mechanism 45 helps feed the material into the baling chamber. The frame can be made of suitable angle iron and the ejector plate 97 serves to eject the tied bale from the baling chamber after the front door has been opened.

In the modified form of the invention shown in Figures 14, 15 and 16 the chains 111 are not used and instead the links 140 and bars 134 are used for retracting the grid bars 106 so that the wires 105 can be tied around the bale 65. The slots 114 and 117 permit the wires to be inserted therethrough. Figure 14 shows the cylinder head in its raised position so that the links 140 are in a horizontal position and in Figure 16 the head 67 is in its lowered position so that the wires 105 can be extended around the bale 65. In Figure 1 the valves are set so that the hydraulic fluid from the cylinders 69, 68 and 70 is bleeding back to the tank 71 and this action is assisted by the action of the various springs connected to the cylinder heads. The length of the chains can be adjusted so that the grid bars will be retracted at the proper time. By properly adjusting the valves hydraulic fluid can be conveyed to the cylinders 68 and 69 so that the heads 66 and 67 can be moved together to compress the material therebetween. The plate 135 prevents material from entering the baling chamber 132 from the hopper 40 when the upper head is moving downwardly. When the chains 111 get tight as a result of the movement of the heads together, there is a space left in the heads which provides clearance so that the wires 105 can be inserted therethrough and manually tied around the bales. Figure 8 shows the ejecting mechanism in extended position such position being in effect after a bale has been ejected from the baling chamber.

I claim:

1. In a machine for baling wood shavings, a frame, a receiving platform arranged contiguous to the lower end of said frame, a baling chamber arranged in said frame, a pair of cylinder heads slidably mounted in said frame for movement towards and away from each other, springs for urging said heads away from each other, an ejector mounted for movement transversely through said baling chamber to eject the bales therefrom, hydraulic means for actuating said ejector and cylinder heads, doors hingedly connected to said frame, locks for maintaining the doors in closed position, each of said heads being provided with a plurality of slots in its inner surface, grid bars for vertical sliding movement mounted in said slots, said bars being disposed in the same plane as that of the head but being depressed in said slots as the heads reach their end positions of compression, and means extending through said heads and connecting said grid bars to said frame.

2. The apparatus as described in claim 1, wherein said last named means comprises a plurality of chains.

3. In a machine for baling wood shavings, a frame, a receiving platform arranged contiguous to the lower end of said frame, a baling chamber arranged in said frame, a pair of cylinder heads slidably mounted in said frame for movement towards and away from each other, springs for urging said heads away from each other, an ejector mounted for movement transversely through said baling chamber to eject the bales therefrom, hydraulic means for actuating said ejector and cylinder heads, each of said heads being provided with a plurality of slots in its inner surface, grid bars for vertical sliding movement mounted in said slots, said bars being disposed in the same plane as that of the head but being depressed in said slots as the heads reach their end positions of compression, and means extending through said heads and connecting said grid bars to said frame, said last named means comprising a plurality of chains.

4. In a machine for baling wood shavings, a frame, a receiving platform arranged contiguous to said frame, a baling chamber arranged in said frame, cylinder heads slidably mounted in said frame for movement towards and away from each other, resilient means for urging said heads away from each other, an ejector mounted for movement transversely through said baling chamber to eject the bales therefrom, hydraulic means for actuating said ejector and cylinder heads, each of said heads being provided with slots, grid bars for vertical sliding movement mounted in said slots, said bars being disposed in the same plane as that of the head but being depressed in said slots as the heads reach their end positions of compression, and means extending through said heads and connecting said grid bars to said frame.

References Cited in the file of this patent

UNITED STATES PATENTS

| | | |
|---|---|---|
| 631,447 | Taft | Aug. 22, 1899 |
| 666,293 | Webb | Jan. 22, 1901 |
| 689,269 | Williams | Dec. 17, 1901 |
| 1,121,571 | Sheppard | Dec. 15, 1914 |
| 1,164,519 | Hill | Dec. 14, 1915 |
| 1,201,695 | Case et al. | Oct. 17, 1916 |
| 1,476,532 | MacIlwaine | Dec. 4, 1923 |
| 1,677,963 | Ford | July 24, 1928 |
| 1,768,214 | Ruth | June 24, 1930 |
| 2,491,015 | Poole | Dec. 13, 1949 |